Aug. 4, 1931.         G. H. COOK         1,817,478
VEHICLE
Filed Oct. 16, 1929
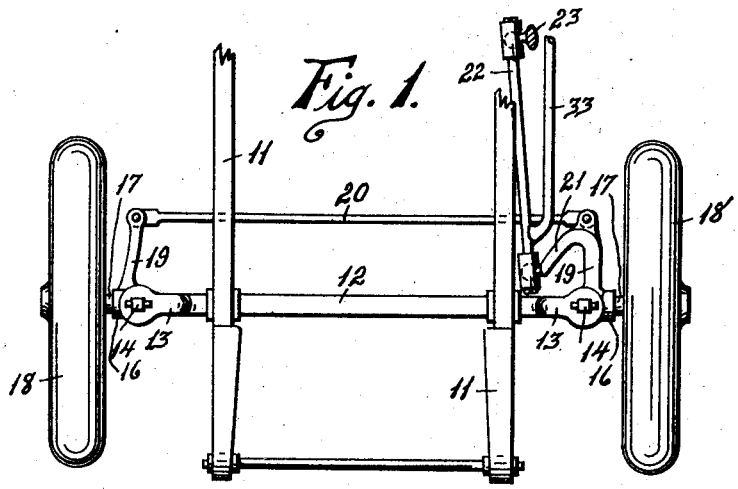
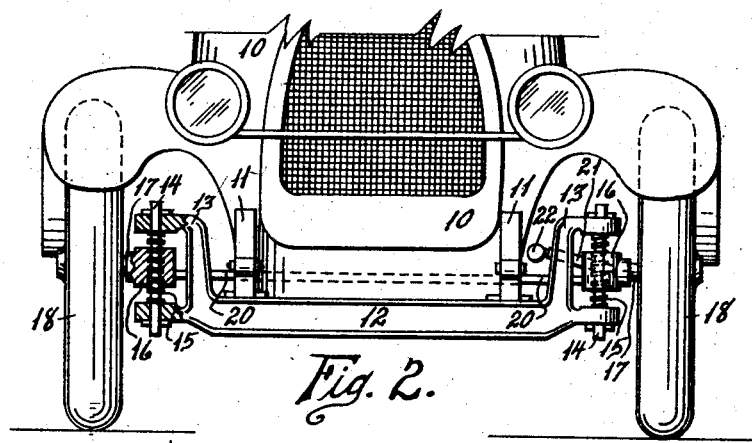
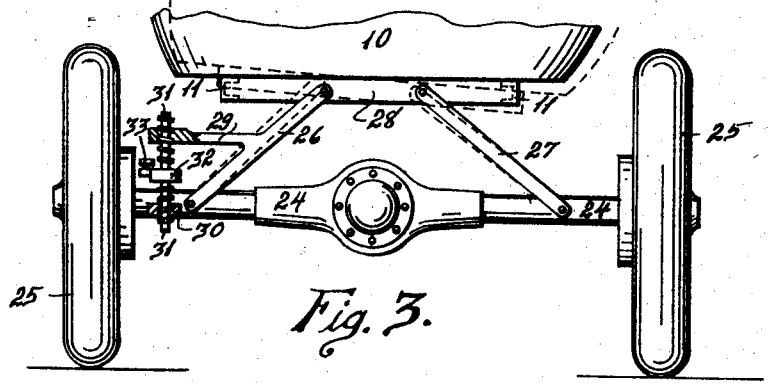
Inventor:
Giles H. Cook.
By Giles Swart.
Attorney.

Patented Aug. 4, 1931

1,817,478

UNITED STATES PATENT OFFICE

GILES H. COOK, OF DES MOINES, IOWA

VEHICLE

Application filed October 16, 1929. Serial No. 399,933.

An object of this invention is to provide means for shifting the center of gravity of a vehicle when making a turn.

A further object of the invention is to provide means for shifting the center of gravity of a vehicle to the inside of a turn when said vehicle is making a turn.

A further object of the invention is to provide automatic means operable through the steering mechanism of a vehicle, whereby the center of gravity of said vehicle is shifted laterally during a turning operation.

A further object of the invention is to provide improved automatic means for counteracting the overturning effect of the centrifugal force acting on a vehicle when making a turn.

A further object of the invention is to provide improved connections between the running gear of a vehicle and the body thereof, whereby said vehicle body may be tilted relative to said running gear when making a turn, in such manner as to shift the center of gravity of said vehicle body toward the inside of the turn to counteract the overturning effect of the centrifugal force acting on said vehicle.

A further object of the invention is to provide an improved vehicle having a body susceptible of lateral oscillation relative to the running gear and connections between the steering mechanism of said vehicle and said body whereby the latter may be automatically tilted to the inside of a turn during a turning operation.

A further object of the invention is to provide an improved vehicle having inherent means for automatically simulating the effect of a laterally inclined roadway turn when said vehicle is being turned.

My invention consists in the construction, arrangement and combination of elements hereinafter set forth, pointed out in my claims and illustrated by the accompanying drawings, in which—

Figure 1 is a plan view of the forward, or steerable, end of a vehicle chassis embodying my improvement, the body portion of the vehicle being omitted. Figure 2 is a front elevation, partly in section, of the steerable end of a vehicle embodying my improvement, a portion of the body of said vehicle being omitted to conserve space. Figure 3 is an elevation, partly in section, of the power or driving end of a vehicle embodying my invention, a portion of the vehicle body being omitted to conserve space.

In the drawings my improvement is shown on and forming part of a conventional motor vehicle, or automobile, to which type of vehicle the invention is particularly applicable, but it is to be understood that the illustrative showing is but typical and that the invention includes the application of the improvement to other specific vehicles or types of vehicles when and wherever it may function in the manner hereinafter described.

In the construction of the improvement as shown, the numeral 10 designates the body of a vehicle suitably supported on a frame 11, in a common and well known manner. An axle 12 extends transversely of and beneath the forward portion of the frame 11 and is fixed to said frame, either directly or through the agency of springs as the purpose of the vehicle may dictate. The ends of the axle 12 extend laterally on each side of and beyond the frame 11 and each end of said axle terminates in a vertical, laterally-opening yoke 13. The parallel arms of each yoke 13 are formed with registering holes in each pair of which is seated a king-pin or bolt 14, said king-pins or bolts connecting each pair of yoke arms and being suitably secured against rotation relative to said arms. The portion of each king-pin or bolt 14 between the arms of each yoke 13 is provided with an external screw thread 15 of relatively high pitch, said screw threads 15 being opposite in direction of pitch, the thread on the left hand side of the vehicle being a "right-hand" screw and the thread on the right hand side of the vehicle being a "left-hand" screw. Spindle bodies 16 each support a spindle 17 and are formed with internally-threaded bores perpendicular to their spindle axes, the threads of said bores corresponding with the screw threads 15 of the king-pins 14, and said spindle bodies 16 are mounted on and in threaded engagement with said king-pins 14 in such manner as to position the spindles 17 in substantial alinement with and projecting beyond the axle 12, so that wheels 18 may be mounted on said spindles for rotation in vertical, parallel planes and for rolling support of the axle 12 and elements carried thereby. Spindle arms 19 are formed on or fixed to each of the spindle bodies 16 and extend rearwardly therefrom in substantially parallel relation, the rear ends of said arms 19 being pivotally interconnected by means of a link 20, whereby the parallelism of the wheels 18 is preserved. A lateral extension 21 is formed on the left hand one of the spindle arms 19 and has its free end connected by means of a link 22 with the free end of a steering arm 23 carried by the vehicle in operative relation with a steering wheel and column (not shown) such as are commonly employed on motor vehicles. It is obvious from the above described relation of elements that when the steering wheel of the vehicle is operated to swing the free end of the arm 23 forwardly of the vehicle, moving the link 22 forwardly to act through the extension 21 and arm 19 to rotate the spindle body on the left hand side of the vehicle about its king-pin 14 and thus move the attached spindle 17 and its wheel 18 through a horizontal arc, that the right hand wheel 18 is moved simultaneously through a similar arc by virtue of the link 20 connecting the arms 19 to effect a left hand turn of the steering end of the vehicle. In like manner, operation of the steering wheel to swing the free end of the steering arm 23 rearwardly of the vehicle reverses the direction of the operations above described and effects a right hand turn of the vehicle. Due to the fact that the spindle bodies 16 are in threaded relation with their respective king-pins 14 and that said king-pins carry threads of opposite pitch, it should be apparent that rotation of said spindle bodies in the same direction about their respective king-pins results in lowering of one end of the axle 12 and raising of the other end, thus tilting the body 10 carried by said axle, the pitch of the threads 15 on said king-pins being such as to lower the end of the axle on the inside of a turn and raise the end of the axle on the outside of the turn so as to throw the center of gravity of the body 10 laterally inward of the turn and thus to a degree counteract the overturning effect of the centrifugal force acting on said body while the turn is being made, the degree of tilt of said body being dependent on the pitch of the threads 15 and the angle through which the wheels 18 are turned out of their normal paths. Naturally, the spindle bodies 16 should be so adjusted on the threads 15 of the king-pins 14 as to maintain the axle 12 in normally level position when the wheels 18 are positioned for straight forward or rearward travel.

As shown in Figure 3, the rear portion of the body 10 carried by the frame 11 is supported from and above the conventional rear axle housing 24 which connects and is supported by the driving wheels 25, by means of links 26 and 27, said links having their lower ends pivotally secured in widely spaced relation to said housing 24 and rising therefrom in a common vertical plane and in converging relation to pivotal connections with a cross-bar 28 of the frame 11, the pivotal connections of the upper ends of said links 26 and 27 lying on opposite sides of the longitudinal median line of the body 10 and being spaced apart a distance considerably less than the spacing of the lower ends of said links on the housing 24. The cross-bar 28 may be free of the frame 11 and serve as a support for springs which in turn carry the frame 11 and body 10, if so desired, such details of construction in no way effecting the principle and operation of the invention. The rear end of the frame 11 and body 10, when mounted and connected as above described, is free to oscillate relative to the housing 24 and wheels 25 when and as the forward end of the vehicle body is oscillated through the tilting of the axle 12, as is indicated by the dotted lines in Figure 3, but to avoid twisting strains on the frame 11 and body 10 it is expedient that the rear end oscillation of said elements be positively controlled and synchronized with the forward end oscillation, for which purpose a rigid arm 29 is fixed to and extends laterally from the link 26 intermediate its ends, said arm 29 terminating in an apertured boss overlying and in spaced vertical alinement with an apertured boss 30 fixed to the housing 24. The apertures in the boss of the arm 29 and in the boss 30 are in axial alinement and are each provided with internal threads of relatively high pitch, the direction of pitch of the threads in one boss being opposite to that of the threads in the other boss, and a spindle 31 having threaded portions opposite in direction of pitch and adapted to engage in the threaded apertures of the bosses above described is mounted between and in threaded engagement through the said bosses in such manner that rotation of said spindle 31 in one direction draws the said bosses together while rotation of the spindle in the opposite direction spreads the said bosses further apart, which change in the relation of said bosses acts through the arm 29 and link 26 to oscillate the body 10 and frame 11 to one side or the other. A lever 32 is fixed to and extends laterally from the spindle 31 and has its free end pivotally connected through a link 33 with the extension arm 21 or link 22, so that movement of either the arm 21 or link 22 is transmitted longitudinally of the vehicle by the link 33 and acts through the lever 32 to rotate the spindle 31, the amount and direction of the rotation of said spindle naturally being dependent on and conforming with the movement of said arm 21 and link 22, the degree and direction of pitch of the threads carried by said spindle being such as to provide tilting of the rear end of the frame 11 and body 10 to the inside of a turn uniformly with the forward end of said elements whenever the steering mechanism is actuated.

Since many changes and modifications in the specific form and construction of the elements shown and described may be had without departing from the spirit of my invention, I wish to be understood as being limited solely by the scope of the appended claims rather than by the illustrative showing and foregoing description.

I claim as my invention—

1. The combination with a vehicle having front and rear axles, steerable wheels supporting the ends of said front axle and non-steerable wheels supporting the ends of said rear axle, of a vehicle body fixed to said front axle and link-connected for oscillation relative to said rear axle, manually-operable means for the control of said steerable wheels, and control means operatively connected with said body supporting means and manually-operable steering means whereby said front axle may be tilted to automatically oscillate said vehicle body to the inside of a turn when said steerable wheels are actuated to turn said vehicle.

2. The combination with a vehicle having an axle, steerable wheels supporting the ends of said axle, a second axle parallel with said first axle, non-steerable wheels supporting the ends of said second axle, a vehicle body fixed to said first axle and link-connected for lateral oscillation to said second axle and manually-operable means for the control of said steerable wheels, of connections between said steerable wheels and the ends of said first axle automatically operable to depress the inner and raise the outer end of said axle when said wheels are actuated to turn said vehicle and further connections between the vehicle steering means and the links supporting said vehicle body whereby said links are automatically adjusted to oscillate said body to the inside of a turn when said steering means is operated.

3. In a vehicle, spaced, parallel front and rear axles, a vehicle body fixed to said front axle and link-connected for lateral oscillation to said rear axle, wheels supporting said rear axle, laterally-opening, vertically-disposed yokes on the ends of said front axle, oppositely-threaded pins vertically-disposed in fixed, parallel relation across the openings of said yokes, spindle bodies threadedly mounted for rotation on and rectilinear travel along said pins, spindles extending laterally from said spindle bodies, wheels on said spindles, parallel arms on said spindle bodies, a link connecting the free ends of said arms and manually-operable means carried by said vehicle and operatively engaging one of said arms whereby said arms and link may be actuated to steer the wheels carried by said spindles, said steering operation depressing one end and raising the other end of said front axle relative to said spindle bodies through the rotation of said spindle bodies on said threaded pins and tilting the vehicle body carried by said axle.

4. In a vehicle, spaced, parallel front and rear axles, a vehicle body fixed to said front axle and link-connected for lateral oscillation to said rear axle, wheels supporting said rear axle, laterally-opening, vertically-disposed yokes on the ends of said front axle, oppositely threaded pins vertically disposed in fixed, parallel relation across the openings of said yokes, spindle bodies threadedly mounted for rotation on and rectilinear travel along said pins, spindles extending laterally from said spindle bodies, wheels on said spindles, parallel arms on said spindle bodies, a link connecting the free ends of said arms, manually-operable means carried by said vehicle and operatively engaging one of said arms whereby said arms and link may be actuated to steer the wheels carried by said spindles, a pair of converging links rising from and pivotally connecting said rear axle with said vehicle body, a boss on said rear axle, a fixed arm on one of said links in spaced, overlying relation with said boss, a spindle extending between and through said boss and fixed arm, said spindle being threaded in one direction through said arm and in an opposite direction through said boss, a lever fixed to said spindle and a link connecting said lever with a movable element of said steering means, whereby actuation of said steering means automatically raises one end and depresses the other end of said front axle and simultaneously rotates said threaded spindle to tilt said vehicle body when said vehicle is being turned from a straight course.

5. In a vehicle having a front axle supported by steerable wheels and laterally tiltable through the steering of said wheels and, a vehicle body in fixed relation with said front axle and manually-operable steering means for the control of said steerable wheels, a wheel-supported rear axle parallel with said front axle beneath said vehicle body, links pivoted to said rear axle and rising therefrom in converging relation to pivotal connection with said vehicle body, a laterally-extending arm fixed to one of said links and connections between said arm and said steering means whereby actuation of the latter automatically moves the former to tilt said vehicle body relative to said rear axle as said front axle is tilted through a steering operation.

6. In a vehicle having wheel-supported axles, a vehicle body fixed to one of said axles and link-connected for lateral oscillation to the other of said axles, steerable wheels on one of said axles and manually-operable steering means for the control of said steerable wheels, means operatively connected with said steering means for automatically tilting the axle fixed to said vehicle body and simultaneously tilting said body relative to the link-connected axle when said steering means is operated to turn said vehicle from a straight course, and means for leveling up the body of the vehicle when it resumes a straight course.

In witness whereof I affix my signature.

GILES H. COOK.